United States Patent
Heitzenrater

(10) Patent No.: US 9,982,727 B2
(45) Date of Patent: May 29, 2018

(54) SELECTABLE ONE WAY CLUTCH LOADED MEMBER RELEASE

(71) Applicant: GM Global Technology Operations LLC, Detroit, MI (US)

(72) Inventor: Scott William Heitzenrater, Orion, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 231 days.

(21) Appl. No.: 15/074,608

(22) Filed: Mar. 18, 2016

(65) Prior Publication Data

US 2017/0268585 A1    Sep. 21, 2017

(51) Int. Cl.
- *F16D 41/16* (2006.01)
- *F16D 25/00* (2006.01)
- *F16D 41/12* (2006.01)

(52) U.S. Cl.
CPC .......... *F16D 41/125* (2013.01); *F16D 25/00* (2013.01); *F16D 41/16* (2013.01)

(58) Field of Classification Search
CPC ......... F16D 41/125; F16D 41/16; F16D 25/00
See application file for complete search history.

(56) References Cited

U.S. PATENT DOCUMENTS

| | | | | |
|---|---|---|---|---|
| 7,766,790 B2* | 8/2010 | Stevenson | .............. | B60K 6/365 192/43.1 |
| 8,051,959 B2* | 11/2011 | Eisengruber | .......... | F16D 41/125 188/82.3 |
| 8,196,724 B2* | 6/2012 | Samie | .................... | B60K 6/383 192/43.1 |
| 2016/0201740 A1* | 7/2016 | Kimes | .................... | F16D 27/14 192/46 |

* cited by examiner

*Primary Examiner* — Jacob S. Scott
*Assistant Examiner* — Lillian T Nguyen

(57) ABSTRACT

A selectable one way clutch includes a reverse strut pocket plate having a first plurality of struts or pawls, a reverse notch and forward strut pocket plate having a second plurality of struts or pawls, a selector plate disposed between the plates controlled by a selector plate actuator and a forward notch plate. The reverse notch and forward strut pocket plate includes a plurality of ratchet teeth disposed about its periphery which cooperate with a pin or pushrod of a linear actuator. When the reverse notch plate and forward strut pocket plate is stationary but the one way clutch is still carrying torque, the linear actuator may be actuated to rotate the reverse notch plate and forward strut pocket plate to unlock or release the torque carrying struts which would otherwise remain in their locked torque transmitting positions until all or substantially all torque across the clutch was removed.

17 Claims, 3 Drawing Sheets

SELECTABLE ONE WAY CLUTCH LOADED MEMBER RELEASE

FIELD

The present disclosure relates to selectable one way clutches (SOWC) and more particularly to a selectable one way clutch having a release for a loaded reverse member such as a strut, pawl, sprag or rocker.

BACKGROUND

The statements in this section merely provide background information related to the present disclosure and may or may not constitute prior art.

One way or overrunning clutches provide a unique operational capability in mechanical power transmission equipment. In their most basic configuration, coaxial first and second members allow relative rotation between them in one direction but lock or connect the members when relative rotation in the opposite direction is attempted. These devices frequently take the form of inner and outer concentric members with pawls, sprags, struts or rockers obliquely disposed therebetween which release the members in one direction of relative rotation and lock them together in the opposite direction of relative rotation.

Other clutch configurations such as selectable one way clutches (SOWC), as the name implies, achieve such one way or overrunning operation in both directions, the overrunning and locking directions being selectable by an associated control device. A difficulty with such devices arises when it is necessary to reverse the one way or overrunning operation from one direction of relative rotation to the other. Before such reversal can be accomplished, all or substantially all torque across the clutch must be removed as it is the torque across the clutch that locks and maintains engagement of the struts or pawls. Generally speaking, the solution to this problem requires that all or substantially all torque through the clutch be eliminated and the force be removed from the pawls or struts by stopping rotation of the device. While in the condition of negligible torque throughput, the sense of the device can be reversed, the time and conditions necessary to achieve this reversal may interfere with other operational aspects of the transmission.

The present invention addresses this difficulty.

SUMMARY

The present invention provides a selectable one way or overrunning clutch capable of releasing the locking struts, sprags or pawls without first reducing the torque across the clutch to or substantially to zero. The selectable one way clutch of the present invention includes an outer reverse strut pocket plate having a first plurality of struts or pawls, an inner reverse notch and forward strut pocket plate having a second plurality of struts or pawls, a selector plate disposed between the plates controlled by a selector plate actuator and a forward notch plate. The reverse notch and forward strut pocket plate includes a plurality of ratchet teeth disposed about its periphery which cooperate with a pin or pushrod of a linear actuator. When the reverse notch plate and forward strut pocket plate is stationary but the one way clutch is still carrying torque, the linear actuator may be actuated to rotate the reverse notch plate and forward strut pocket plate to unlock or release the torque carrying struts which would otherwise remain in their locked torque transmitting positions until all or substantially all torque across the clutch was removed. Depending upon the sense of the ratchet teeth and the orientation of the linear actuator, either the reverse struts or the forward struts may be released by motion of the linear actuator. The ability to release the clutch struts under load and upon the action of the actuator provides improved control during gear shifts and direction changes.

Thus it is an aspect of the present invention to provide an improved selectable one way or overrunning clutch.

It is a further aspect of the present invention to provide a selectable one way clutch having torque carrying struts or pawls that may be released while still carrying torque.

It is a still further aspect of the present invention to provide a selectable one way clutch having a reverse notch plate and forward strut pocket plate with ratchet teeth disposed about its periphery.

It is a still further aspect of the present invention to provide a selectable one way clutch having a linear actuator which cooperates with ratchet teeth on the periphery of a reverse notch plate and forward strut pocket plate.

It is a still further aspect of the present invention to provide a selectable one way clutch having a linear actuator which cooperates with ratchet teeth on the periphery of a reverse notch plate and forward strut pocket plate to release torque on the struts or pawls of the one way clutch.

It is a still further aspect of the present invention to provide a selectable one way clutch having a linear actuator which cooperates with ratchet teeth on the periphery of a reverse notch plate and forward strut pocket plate to release torque on either the forward or reverse struts or pawls of the clutch.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
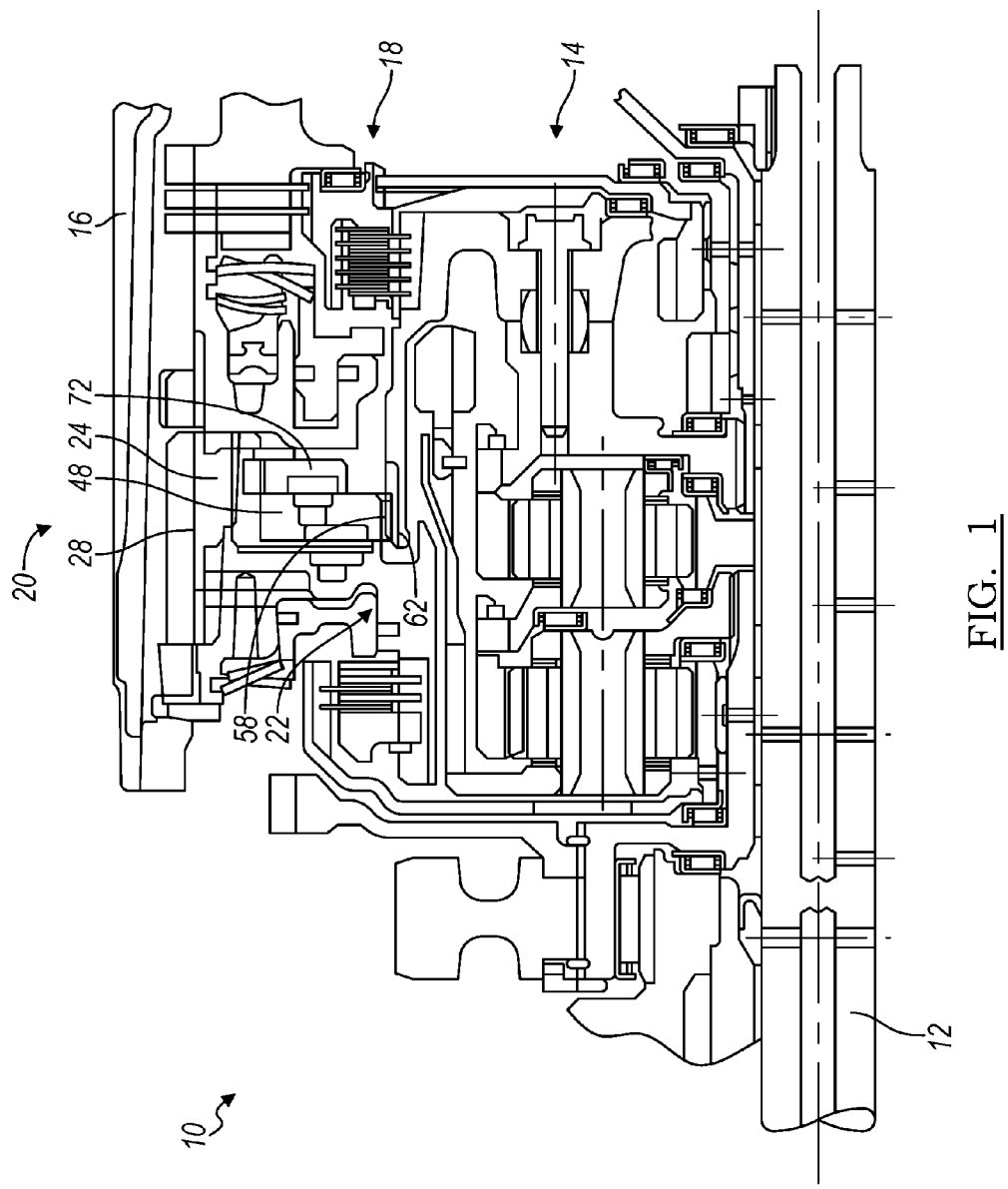
FIG. 1 is a fragmentary, sectional view of a portion of a motor vehicle automatic transmission incorporating the present invention.

With reference now to FIG. 1, a portion of a motor vehicle automatic transmission is illustrated and generally designated by the reference number 10. The automatic transmission 10 includes an input or drive shaft 12 which may be the output shaft of a torque converter (not illustrated), a plurality of planetary gear assemblies 14, two of which are illustrated in FIG. 1, an output shaft which is coupled to a prop shaft and a final drive assembly (both not illustrated) and a housing 16, typically cast of metal, which supports, locates and protects the various internal components of the automatic transmission 10. Additionally, the automatic transmission 10 includes a plurality of friction clutches and brakes 18 that cooperate with the elements of the planetary gear assemblies 14 to provide a sequence of forward gear ratios or ranges and reverse gear as those skilled in the motor vehicle transmission art will readily understand.

Operably disposed between, for example, the housing 16 and an element of one of the planetary gear assemblies 14, such as a ring gear or a planetary gear carrier, is a releasable, selectable one way clutch assembly 20 incorporating the present invention.

Figure 2:
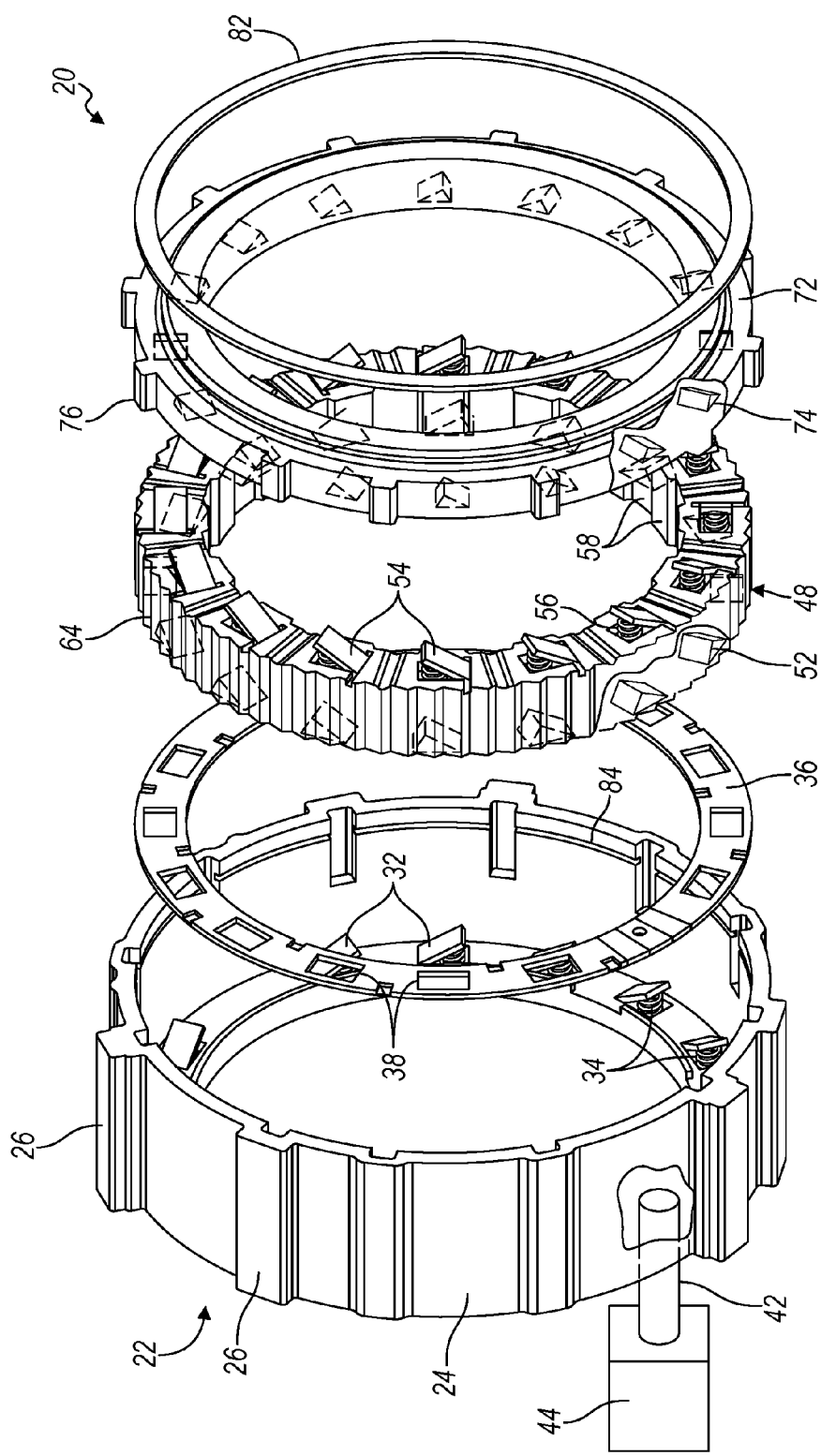
FIG. 2 is an exploded view of a selectable one way clutch according to the present invention.

Referring now to FIGS. 1 and 2, the releasable, selectable one way clutch assembly 20 includes an outer member, namely, a reverse strut or pawl pocket plate 22. The reverse strut or pawl pocket plate 22 is preferably stationary and defines an annular body 24 having a plurality of axially extending lugs or splines 26 on its outer surface which mate with complementarily configured slots 28 in the transmission housing 16. The reverse strut or pawl pocket plate 22 includes a first plurality of circumferentially spaced apart reverse struts, pawls, sprags or rockers 32 that are spring biased away from the reverse strut or pawl pocket plate 22 by a respective plurality of compression springs 34. A selector plate 36 having a plurality of substantially rectangular through openings or apertures 38 corresponding in number and arrangement to the struts, pawls, sprags or rockers 32 is disposed adjacent the reverse strut or pawl pocket plate 22. The selector plate 36 is coupled to a linkage 42 and rotated through a small angular sector by a selector plate actuator 44 which is preferably hydraulically or electrically operated.

Adjacent the selector plate 36 is disposed an inner member, namely, a reverse notch and forward strut or pawl pocket plate 48. The reverse notch and forward strut or pawl pocket plate 48, as the name suggests, includes on its back face (in FIG. 2) a plurality of notches or recesses 52 corresponding in number and arrangement to the number of reverse struts or pawls 32 and selectively engagable thereby. On the front face of the forward strut or pawl pocket plate 48 are a second plurality of circumferentially spaced apart forward struts, pawls, sprags or rockers 54 biased away from the plate 48 by a like plurality of compression springs 56. The inner surface of the reverse notch and forward strut or pawl pocket plate 48 defines circumferential alternating projections and recesses 58 which mate with and rotationally couple the reverse notch and forward strut or pawl pocket plate 48 to a transmission element, for example, a planet gear carrier 62 of one of the planetary gear assemblies 14. It should be understood that other rotational coupling components such as male and female splines and gear teeth may alternatively be utilized. The outer surface of the reverse notch and forward strut or pawl pocket plate 48 defines a plurality of sawtooth or ratchet teeth 64, that is, teeth having a first substantially radial face and a second oblique face. Additional description of the ratchet teeth 64 and their purpose appears below.

Adjacent the reverse notch and forward strut or pawl pocket plate 48 is a forward notch plate 72 having a plurality of circumferentially spaced apart notches or recesses 74 corresponding in number and arrangement to the number and arrangement of the forward struts or pawls 54 and which are selectively engagable thereby. The forward notch plate 72 includes a plurality of axially oriented lugs or splines 76 on its periphery which are engaged by complementarily configured features in a component of the transmission 10 to achieve torque transfer between the forward notch plate 72 and the coupled component. Preferably, the foregoing elements of the releasable, selectable one way clutch assembly 20 are retained in position within the transmission 10 by a snap ring 82 which seats within a circumferential slot 84 in the annular body 24 of the reverse strut or pawl pocket plate 22.

Figure 3:
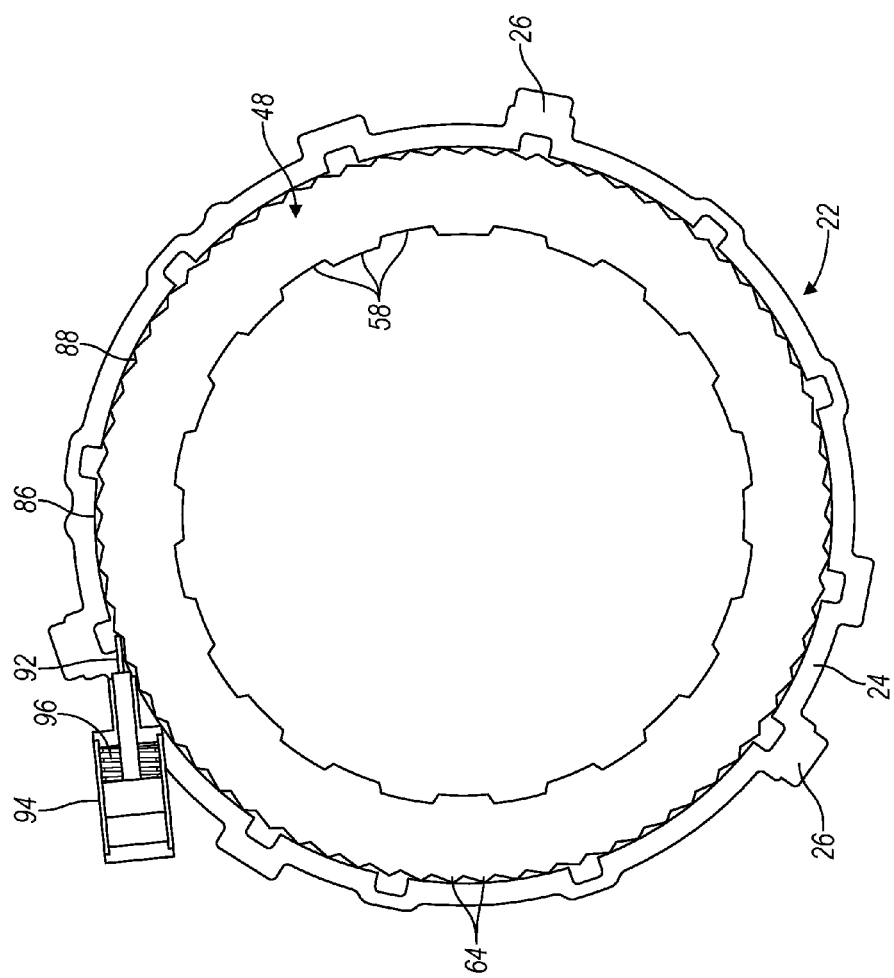
FIG. 3 is a full sectional view of a selectable one way clutch according to the present invention.

Referring now to FIGS. 2 and 3, the reverse notch and forward strut or pawl pocket plate 48, as stated above, includes a plurality of sawtooth or ratchet teeth 64 disposed on its outer surface. Each of the plurality of ratchet teeth 64 include a substantially radially oriented portion 86 and an oblique portion 88. The substantially radially oriented portion 86 of each of the plurality of sawtooth or ratchet teeth 64 cooperate with a pin or pushrod 92 of a linear actuator 94 tangentially aligned with the outer surface of the reverse notch and forward strut or pawl pocket plate 48. The linear actuator 94 may be either hydraulically, electrically or pneumatically operated and preferably includes a spring 96 which biases the pin or pushrod 92 into a retracted position. Upon extension of the pin or pushrod 92, it engages one of the substantially radially oriented portions 86 of the plurality of sawtooth or ratchet teeth 64 and rotates the reverse notch and forward strut or pawl pocket plate 48 through a small angle of rotation.

It should be understood that, as stated, the extent of rotation of the reverse notch and forward strut or pawl pocket plate 48 needed to release the struts or pawls 32 is small. An operable configuration of the invention includes seventy-two sawtooth or ratchet teeth 64; thus each tooth 64 occupies 5°. It should be appreciated that more or fewer sawtooth or ratchet teeth 64 may be utilized depending primarily on the diameter of the reverse notch and forward strut or pawl pocket plate 48 but the number should not be so large that the rotation of the reverse notch and forward strut or pawl pocket plate 48 provided by the linear actuator 94 is less than about 3°.

The operation of the releasable selectable one way clutch assembly 20 will now be described. Assuming the selector plate 36 is rotated so that the reverse struts or pawls 32 may extend into the notches 52 of the reverse notch and forward strut or pawl pocket plate 48 and that torque across the outer member, the reverse strut or pawl pocket plate 22 and the inner member, the reverse notch and forward strut or pawl pocket plate 48 is such that the reverse struts or pawls 32 are held in the notches 52, they will remain engaged there until all or substantially all torque through or across the members of the clutch assembly 20 is removed. As noted above, waiting for this condition to occur may interfere with smooth and rapid transmission shifts. With the present invention, the linear actuator 94 may be energized to slightly rotate the reverse notch and forward strut or pawl pocket plate 48. Such rotation is sufficient to remove torque from the reverse struts or pawls 32 and release them from engagement with their corresponding notches 52. When so released, the selector plate 36 may be rotated by the actuator 44 to change the sense, i.e., relative rotations of overrunning and locking, of the releasable, selectable one way clutch 20.

The foregoing description has presented the releasable, selectable one way clutch assembly 20 as operating only with one of the plurality of struts characterized as the "reverse struts 32". It should be appreciated that this naming convention has been undertaken primarily for reasons of simplicity and clarity and that it should not be interpreted as limiting the present invention to release of only such "reverse" struts inasmuch as whether struts are "reverse" or "forward," in fact, relates to the application of the device, not the device itself.

The description of the invention is merely exemplary in nature and variations that do not depart from the gist of the invention are intended to be within the scope of the invention. Such variations are not to be regarded as a departure from the spirit and scope of the invention.

What is claimed is:

1. A selectable one way clutch assembly comprising:
   an outer strut plate having a plurality of first struts extending therefrom,
   an inner strut plate having a plurality of second struts extending therefrom,
   a selector plate disposed between said outer strut plate and said inner strut plate and having a plurality of openings cooperating with said first struts,
   a notch plate disposed adjacent said inner strut plate,
   said inner strut plate having an outer surface and a plurality of ratchet teeth disposed about said outer surface,
   a ratchet pin aligned with said ratchet teeth and a linear actuator for translating said ratchet pin into engagement with said ratchet teeth and rotating said inner strut plate.

2. The selectable one way clutch assembly of claim 1 wherein said linear actuator is a hydraulic actuator.

3. The selectable one way clutch assembly of claim 1 wherein said selector plate includes a plurality of through openings.

4. The selectable one way clutch assembly of claim 1 further including a second actuator for rotating said selector plate.

5. The selectable one way clutch assembly of claim 1 wherein said ratchet pin is tangentially aligned with said outer surface of said inner strut plate.

6. The selectable one way clutch assembly of claim 1 wherein said outer strut plate is coupled to a housing of a transmission.

7. The selectable one way clutch assembly of claim 1 wherein said inner strut plate is coupled to an element of a planetary gear assembly.

8. A releasable selectable one way clutch assembly, comprising:
   a reverse strut plate having a first plurality of struts extending therefrom,
   a reverse notch and forward strut plate having a second plurality of struts extending therefrom, a periphery and a plurality of ratchet teeth disposed on said periphery,
   a selector plate disposed between said reverse strut plate and said reverse notch and forward strut plate and having a plurality of openings cooperating with said first plurality of struts,
   a forward notch plate disposed adjacent said reverse notch and forward strut plate, and
   a ratchet pin aligned with said ratchet teeth and a linear actuator for translating said ratchet pin into engagement with said ratchet teeth and rotating said reverse notch and forward strut plate.

9. The releasable selectable one way clutch assembly of claim 8 wherein said ratchet pin is tangentially aligned with said periphery of said inner strut plate.

10. The releasable selectable one way clutch assembly of claim 8 further including a second actuator for rotating said selector plate.

11. The releasable selectable one way clutch assembly of claim 8 wherein said reverse strut plate is coupled to a housing of a transmission.

12. The releasable selectable one way clutch assembly of claim 8 wherein said reverse notch and forward strut plate is couped to an element of a planetary gear assembly.

13. The releasable selectable one way clutch assembly of claim 8 wherein said reverse notch and forward strut plate and said forward notch plate each include notches engagable by one of said first and second pluralities of struts.

14. A releasable selectable one way clutch assembly for an automatic transmission, comprising:
   a reverse strut plate having a plurality of reverse struts extending therefrom,
   a reverse notch and forward strut plate having a plurality of forward struts extending therefrom, a plurality of notches engagable by said plurality of reverse struts, a periphery and a plurality of ratchet teeth disposed on said periphery,
   a selector plate disposed between said reverse strut plate and said reverse notch and forward strut plate and having a plurality of openings aligned with said struts,
   a forward notch plate disposed adjacent said reverse notch and forward strut plate and including a plurality of notches engagable by said plurality of forward struts, and
   a linear actuator having a ratchet pin aligned with said ratchet teeth for translating said ratchet pin into engagement with said ratchet teeth and rotating said reverse notch and forward strut plate.

15. The releasable selectable one way clutch assembly of claim 14 further including a second actuator for rotating said selector plate.

16. The releasable selectable one way clutch assembly of claim 14 wherein said reverse strut plate is splined to a housing of a transmission.

17. The releasable selectable one way clutch assembly of claim 14 wherein said reverse notch and forward strut plate is splined to an element of a planetary gear assembly.

* * * * *